(12) United States Patent
Schaefer et al.

(10) Patent No.: US 12,480,850 B2
(45) Date of Patent: Nov. 25, 2025

(54) TENSION LOAD FIXTURE AND METHOD FOR EVALUATING FRACTURE BEHAVIOR OF A COMPOSITE MATERIAL

(71) Applicant: The Boeing Company, Chicago, IL (US)

(72) Inventors: Joseph D. Schaefer, Richmond Heights, MO (US); Brian P. Justusson, Saint Peters, MO (US); Haozhong Gu, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 259 days.

(21) Appl. No.: 17/726,091

(22) Filed: Apr. 21, 2022

(65) Prior Publication Data

US 2023/0341303 A1 Oct. 26, 2023

(51) Int. Cl.
*G01N 3/08* (2006.01)

(52) U.S. Cl.
CPC ....... *G01N 3/08* (2013.01); *G01N 2203/0017* (2013.01); *G01N 2203/04* (2013.01)

(58) Field of Classification Search
CPC ... G01N 3/08; G01N 3/04; G01N 2203/00–04
See application file for complete search history.

(56) References Cited

U.S. PATENT DOCUMENTS

| | | | | |
|---|---|---|---|---|
| 4,481,826 A * | 11/1984 | Ingraffea | ................ | G01N 3/20 73/799 |
| 5,305,645 A * | 4/1994 | Reifsnider | ............... | G01N 3/32 73/808 |
| 8,825,423 B1 * | 9/2014 | Brovold | .................. | G01N 3/08 702/41 |
| 10,190,955 B2 * | 1/2019 | Hossain | .................... | G01N 3/40 |
| 10,368,854 B2 * | 8/2019 | Pell | .................... | A61B 17/0293 |
| 11,207,867 B1 * | 12/2021 | Melaibari | ................ | B32B 5/02 |
| 2006/0070452 A1 * | 4/2006 | Bohlmann | .............. | G01N 3/08 73/800 |
| 2012/0240688 A1 * | 9/2012 | Myers | ...................... | G01N 3/08 |
| 2017/0219469 A1 * | 8/2017 | Gu | ............................ | G01N 3/08 |
| 2018/0088013 A1 * | 3/2018 | Schaefer | ................. | G01N 3/08 |
| 2019/0170627 A1 * | 6/2019 | Schaefer | ................. | G01N 3/08 |

(Continued)

FOREIGN PATENT DOCUMENTS

WO WO-2017122080 A1 * 7/2017

*Primary Examiner* — Fatemeh Esfandiari Nia
(74) *Attorney, Agent, or Firm* — Harrity & Harrity, LLP (57) ABSTRACT

A tension load fixture for applying tension or loading forces to a specimen comprises a pair of tension arms and an imaging device. The pair of tension arms are configured to releasably couple to opposite end regions of a specimen and to apply tension or loading forces to the specimen. The specimen is configured to be positioned between the pair of tension arms and defines a notch between the opposite end regions of the specimen. The notch extends from a side of the specimen to a middle region of the specimen. The imaging device is configured to capture one or more images of the middle region of the specimen and is configured to rotate about a central axis of the tension load fixture that is proximate to the middle region of the specimen to facilitate generation of a three-dimensional image of the middle region of the specimen as the specimen is subjected to tension or loading forces.

20 Claims, 6 Drawing Sheets

(56) References Cited

U.S. PATENT DOCUMENTS

| | | | |
|---|---|---|---|
| 2020/0088655 A1* | 3/2020 | Nakayama | G01N 3/08 |
| 2020/0141847 A1* | 5/2020 | Okajima | G01N 3/02 |
| 2021/0124809 A1* | 4/2021 | Han | G01N 3/40 |

* cited by examiner

TENSION LOAD FIXTURE AND METHOD FOR EVALUATING FRACTURE BEHAVIOR OF A COMPOSITE MATERIAL

BACKGROUND

Field

This application generally relates to the analysis of structural components. In particular, this application describes example methods and systems for applying tension or loading forces to a specimen that comprises a composite material to thereby facilitate evaluating the fracture behavior of the composite material.

Description of Related Art

Typical composite materials comprise a combination of matrix phases and reinforcing layers. Some examples of the matrix phases comprise polymers, metals, ceramics, etc. Some examples of the reinforcing layers comprise a fiber or a particulate material. In some examples, the matrix phases and reinforcing layers are oriented in different directions (e.g., matrix at 0° and reinforcing layers at 90°). Some examples of composite materials may have better properties in terms of strength and toughness than any of the constituent material layers.

SUMMARY

In a first aspect, a tension load fixture for applying tension or loading forces to a specimen comprises a pair of tension arms and an imaging device. The pair of tension arms are configured to releasably couple to opposite end regions of a specimen and to apply tension or loading forces to the specimen. The specimen is configured to be positioned between the pair of tension arms and defines a notch between opposite end regions. The notch extends from a side of the specimen to a middle region of the specimen. The imaging device is configured to capture one or more images of the middle region of the specimen and is configured to rotate about a central axis of the tension load fixture that is proximate to the middle region of the specimen to facilitate the generation of a three-dimensional image of the middle region of the specimen as the specimen is subjected to tension or loading forces.

In a second aspect, a method for evaluating a specimen as the specimen undergoes tension or loading forces comprises applying, by a tension load fixture and via a pair of tension arms, tension or loading forces to a specimen. The specimen is configured to be positioned between the pair of tension arms and defines a notch between opposite end regions of the specimen. The notch extends from a side of the specimen to a middle region of the specimen. The method further comprises rotating an imaging device about a central axis of the tension load fixture that is proximate to the middle region of the specimen to facilitate the generation of a three-dimensional image of the middle region of the specimen as the specimen is subjected to tension or loading forces.

In a third aspect, a non-transitory computer-readable medium stores instruction code that facilitates evaluating a specimen as it undergoes tension or loading forces. Execution of the instruction code by one or more processors of a computing system causes the computing system to control a tension load fixture to perform operations comprising applying, by the tension load fixture and via a pair of tension arms, tension or loading forces to a specimen. The specimen is configured to be positioned between the pair of tension arms and defines a notch between opposite end regions of the specimen. The notch extends from a side of the specimen to a middle region of the specimen. The method further comprises rotating an imaging device about a central axis of the tension load fixture that is proximate to the middle region of the specimen to facilitate the generation of a three-dimensional image of the middle region of the specimen as the specimen is subjected to tension or loading forces.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Numerous examples of systems, devices, and/or methods are described herein. Any embodiment, implementation, and/or feature described herein as being an example is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein are meant that the recited characteristic, parameter, or value need not be achieved exactly, but that deviations or variations, including, for example, tolerances, measurement error, measurement accuracy limitations and other factors known to those skilled in the art, may occur in amounts that do not preclude the effect the characteristic was intended to provide.

Introduction

Composite materials tend to use synergistic effects to improve mechanical properties of constituent materials. Conventional test equipment for evaluating the fracture behavior (e.g., toughness and strain energy release rate) of a specimen formed from such a material is configured to apply loading forces to the specimen. The specimen is subsequently evaluated to determine whether any cracks have formed. In some examples, this involves positioning and imaging device close enough (e.g., less than 1 inch) to the specimen to capture a front/two-dimensional view of any micro cracks that develop within the specimen.

However, such test equipment is incapable of imaging microcracks and macrocracks not visible on the surface that may develop within internal layers (e.g., cracks in matrix phase and reinforcing layers) of the specimen. These and other issues associated with the evaluation of such specimens are ameliorated by numerous examples of tension load fixtures described herein.

Some examples of the tension load fixture are configured to perform in-situ computed tomography to measure crack length on a layer-by-layer basis within the composite material during testing to facilitate three-dimensional measurement of a crack in the composite material (e.g., measurement of the crack within the composite material volume). In some examples, the tension load fixture is configured to apply static and cyclic loading to the specimen while performing these measurements.

Some examples of the tension load fixture facilitate capturing damage modes on a failure-mode-basis to separate matrix and fiber modes and track these damage modes on a layer-by-layer basis during loading. Some examples of the tension load fixture facilitate capturing damage modes in different orthotropic directions (e.g., when using woven materials).

Some examples of the tension load fixture are configured to digitally measure the length of cracks that develop in the specimen during testing, which improves crack length measurement accuracy. In some examples, digital measurement systems (e.g., a deflectometer) is inserted into the crack to facilitate measuring the length of the crack. This type of measurement system is more suited to measurements involving homogenous materials.

Some examples of the tension load fixture are configured to secure the specimen in a manner that maintains appropriate load alignment within the specimen during testing without occluding the imaging area of the specimen. This facilitates the characterization of the crack without causing blurring issues that can occur in conventional approaches.

Some examples of the specimen are configured to facilitate increasing the distance for the crack to grow. This, in turn, provides more data for improved sample population statistics. In this regard, some examples of the specimen are configured to prevent compression failure on the back end of the specimen that can occur in conventional approaches. This further facilitates measuring increased crack lengths.

Some examples of the specimen define a notch geometry on a front end. The notch geometry creates a crack tip that has micron sharpness, which is orders of magnitude sharper than conventional methods, which only create millimeter crack tips. Tension applied to the specimen creates an opening mode at the crack tip to facilitate crack extension. This aspect reduces error in the initial peak load in the test. Further, these aspects facilitate generating better test data during crack growth since there is limited crack extension during the growth.

Some particular examples of the tension load fixture comprise a pair of tension arms configured to releasably couple to opposite end regions of a specimen and to apply tension and/or loading forces to the specimen. Some examples of the specimen comprise several adhesively bonded layers. The specimen is configured to be positioned between the pair of tension arms and defines a notch in a middle region between the tension arms. An imaging device (e.g., a computerized tomography (CT) scanner) is configured to generate a three-dimensional (3D) image of the middle region of the specimen as the loading force is applied to the specimen. In this regard, some examples of the imaging device are configured to rotate about a central axis of the tension load fixture that intersects the middle region of the specimen. In some examples, the scanning device makes numerous rotations around the specimen as the tension load fixture applies tension or a loading forces to the specimen.

Some examples of the tension arms comprise a first section and a second section. The longitudinal axis of the respective first sections of the tension arms correspond with the central axis, and the respective second sections of the tension arms are offset from the central axis by a particular distance. This configuration facilitates appropriate load alignment within the specimen during testing without occluding the imaging area of the specimen.

Some examples of the respective second sections are configured to be releasably coupled to opposite ends of the specimen. Some examples of the second sections comprise a pair of plates configured to abut opposite surfaces of the specimen, and, in some examples, the distance between the pair of plates is configured to be substantially equal to the thickness of the specimen. This configuration facilitates testing specimens of varying thicknesses.

Figure 1A:
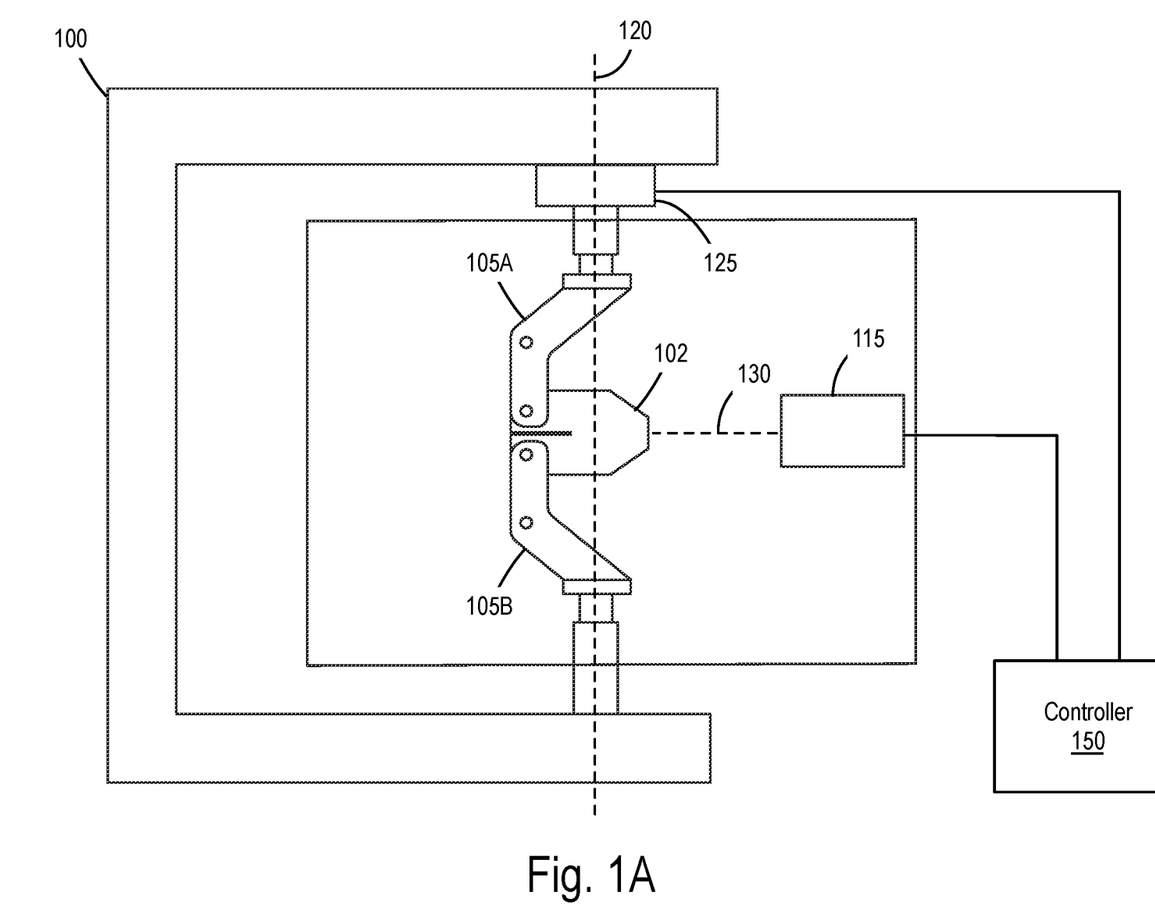
FIG. 1A illustrates a tension load fixture, in accordance with example embodiments.

FIG. 1A illustrates an example of a tension load fixture 100. Some examples of the tension load fixture 100 are configured to apply tension and/or loading forces to a specimen 102. In this regard, some examples of the tension load fixture 100 comprise a pair of tension arms (105A, 105B) that are configured to releasably couple to opposite end regions of the specimen 102. Tension and/or loading forces generated by the tension load fixture 100 are translated to the specimen 102 via the tension arms (105A, 105B).

Some examples of the tension load fixture 100 are configured to pull and/or push on the specimen 102 with a specified amount of force. In this regard, some examples of the tension load fixture 100 are configured to apply fatigue loading to the specimen 102. For instance, some examples of the tension load fixture 100 are configured to pull (or push) on the specimen 102 during a first interval of a loading cycle and then apply little to no force on the specimen 102 during a second interval of the loading cycle. Similarly, some examples of the tension load fixture 100 are configured to push on the specimen during a first interval of a loading cycle and then to pull on the specimen 102 during a second interval. In this regard, some examples of the tension load fixture 100 are in communication with a controller 150. Some examples of the controller 150 comprise instruction code configured to control the tension load fixture 100 to generate tension and/or loading forces according to a load force profile. Some examples of the load force profile specify the amount of tension and/or loading force to apply to the specimen 102 during various intervals.

Figure 1B:
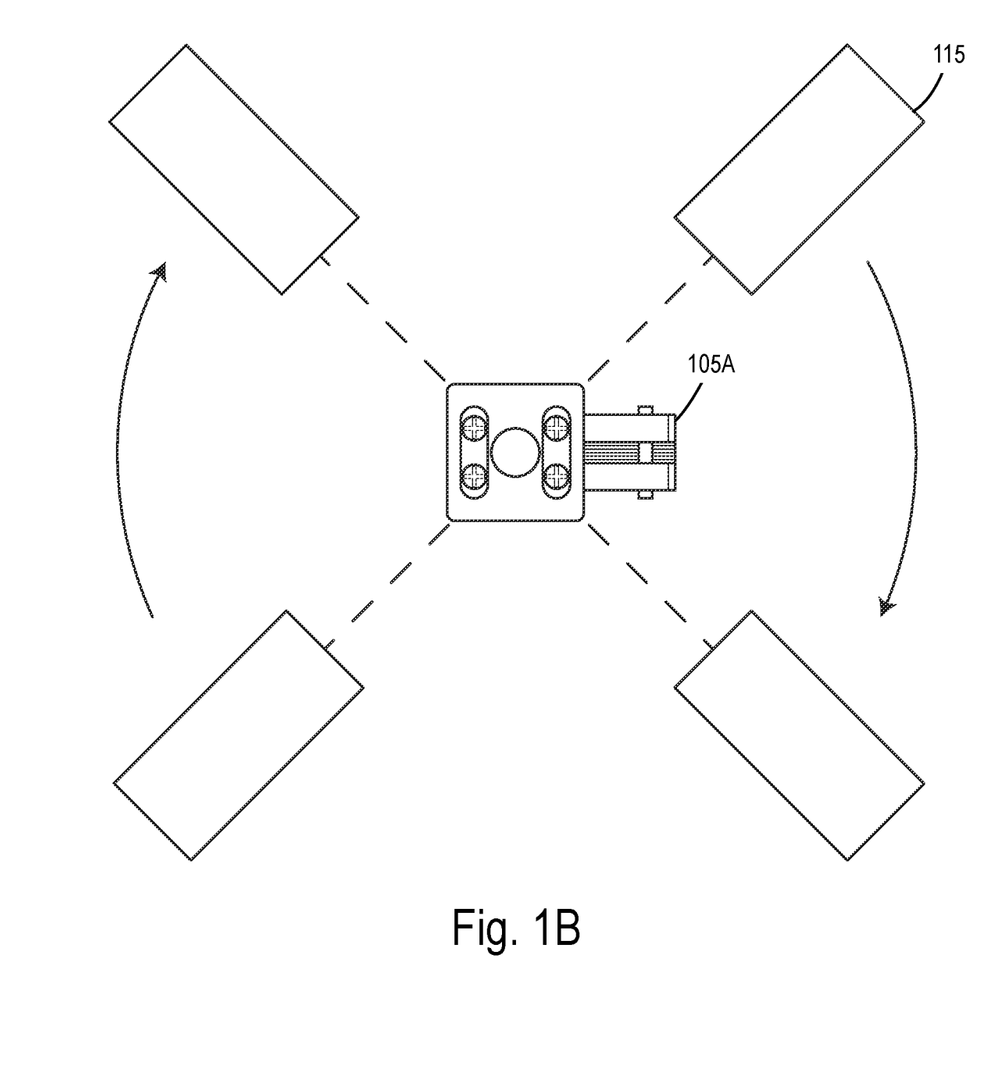
FIG. 1B illustrates an imager of a tension load fixture rotating around a specimen, in accordance with example embodiments.

Some examples of the tension load fixture 100 comprise an imaging device 115. Some examples of the imaging device 115 facilitate the generation of a 3D image of the middle region of the specimen 102 as tension and/or loading forces are applied to the specimen 102. In this regard, as shown in FIG. 1B, some examples of the imaging device 115 are configured to rotate about a central axis 120 of the tension load fixture 100 that intersects the middle region of the specimen.

In some examples, the imaging device 115 corresponds to a computed tomography (CT) scanner. Some examples of the CT scanner are configured to output a scan beam 130 that intersects the middle region of the specimen 102.

Some examples of the imaging device 115 are in communication with the controller 150. Some examples of the controller 150 are configured to compile/convert information received from the imaging device 115 into the above-referenced 3-D image. Some examples of the controller 150 are configured to identify and determine, based on the information from the imaging device 115, characteristics of one or more cracks that develop in the specimen 102 during the application of the tension and/or loading forces. For instance, some examples of the controller 150 are configured to determine the dimensions of one or more cracks (e.g., length, height, position, etc.), the layer(s) of the specimen 102 in which the cracks occur (e.g., matrix phase 5, reinforcement layer 2, etc.). Some examples of the controller 150 are configured to output data that relates the characteristics of one or more cracks with the amount of tension and/or loading forces applied specimen 102 during any particular interval.

Figure 2A:
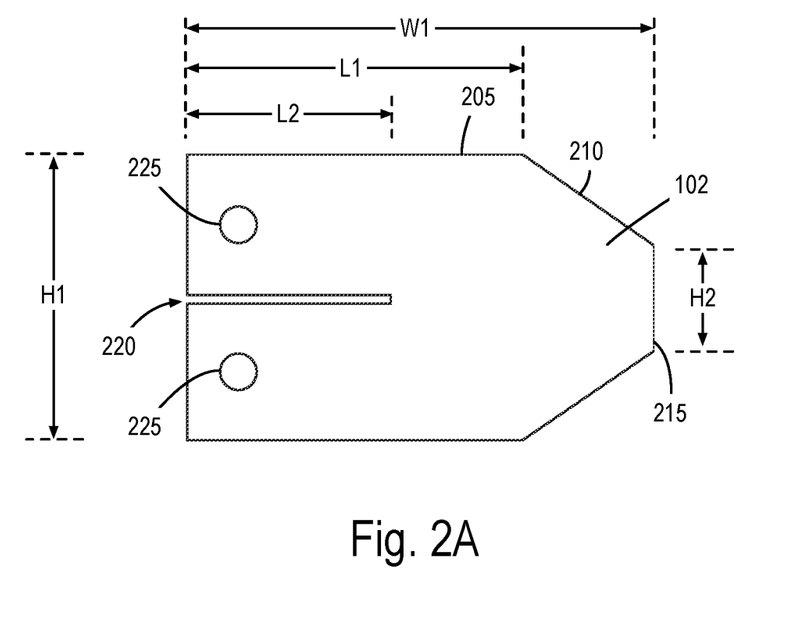
FIG. 2A illustrates a side view of a specimen, in accordance with example embodiments.
Figure 2B:
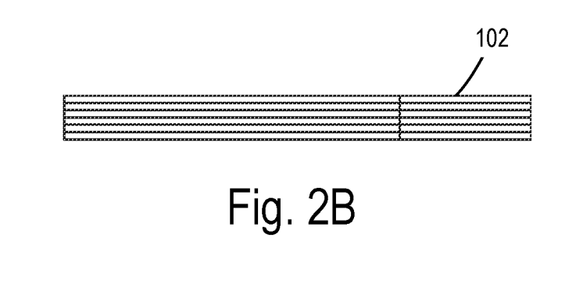
FIG. 2B illustrates a top view of a specimen, in accordance with example embodiments.

FIG. 2A illustrates a side view of an example of a specimen 102. FIG. 2B illustrates a top view of the specimen 102. Some examples of the specimen 102 comprise a composite material (e.g., a combination of matrix phases and reinforcing layers). In this regard, some examples of the specimen 102 comprise several bonded plies or layers of materials (e.g., 16 matrix phases and 16 reinforcing layers). In some examples, the layers are coupled together via an adhesive. Some examples of the layers (e.g., matrix phases) comprise polymers, metals, ceramics, etc. Some examples of the layers (e.g., reinforcing layers) comprise a fiber or a particulate material.

As shown, some examples of the specimen 102 have a shape that is symmetrical about a horizontal line of symmetry. For instance, some examples of the specimen 102 comprise a top edge and a bottom edge that each comprise a first section 205 and a second chamfered section 210. The chamfered sections 210 extend to the right edge 215 of the specimen 102. Respective first sections 205 of the top and bottom edges are substantially parallel with one another, and the right edge 215 is substantially perpendicular to the respective first sections of the specimen 102.

Some examples of the specimen 102 have an overall width, W1, and height, H1, of about 3.5" and 2.375", respectively. In some examples, the length, L1, of the first section 205 is about 2.5" and the height, H2, of the right edge 215 is about 0.88". Some other examples of the specimen (see e.g., FIG. 3B) have an overall width, W1, and height, H1, of about 3.5" and 6.375", respectively. In some examples, the length, L1, of the first section 205 is about 2.0" and the height, H2, of the right edge 215 is about 1.18".

The chamfered section 210 is configured to mitigate the occurrence of compression failure on the right edge 215 of the specimen that can occur in some instances during testing. In particular, the chamfered section 210 reduces stress concentration at the right edge 215 of the specimen 102, which can occur in a specimen that has a generally rectangular shape.

Some examples of the specimen define a notch 220 on a left edge. The notch 220 is configured to control the starting location of a crack that will eventually develop in the specimen 102 when the specimen 102 undergoes tension and/or loading forces in the tension load fixture 100. That is, the notch 220 ensures that the crack in the specimen 102 that results from application of the tension and/or loading forces will not start on the right edge 215 of the specimen 102.

An example of the notch 220 extends from the left edge by a distance, L2, of about 1.5" to a middle region of the specimen 102. In some examples, the length of the notch 220 is selected so that the notch 220 extends to a region of the specimen 102 that corresponds with the central axis 120 of the tension load fixture 100. In this regard, in some examples, extending the notch 220 to this region ensures that the onset of the formation of the crack will be viewable in sufficient detail (e.g., with enough resolution) by the imaging device 115.

In some examples, the notch 220 is formed in the specimen 102 using a water jet. Next, a bamboo saw is used to refine the end of the notch (i.e., the point in the middle region of the specimen 102 where the notch extends). The end of the notch 220 is refined further using a razor to achieve sub-micron sharpness prior to testing. These steps mitigate the pre-mature onset of a crack in the notch 220.

In some examples, the orientations of the layers of the specimen 102 are alternated. For example, first layers (e.g., matrix material phases) extend in the same direction as the notch 220 and second layers (e.g., reinforcing layers) extend perpendicularly to the notch 220.

Some examples of the specimen 102 define a pair of openings 225 in opposite end regions of the specimen 102. As described further below, the openings 225 are configured to receive a pin 325 that facilitates releasably coupling the tension arms (105A, 105B) to the opposite end regions of the specimen 102.

Figure 3A:
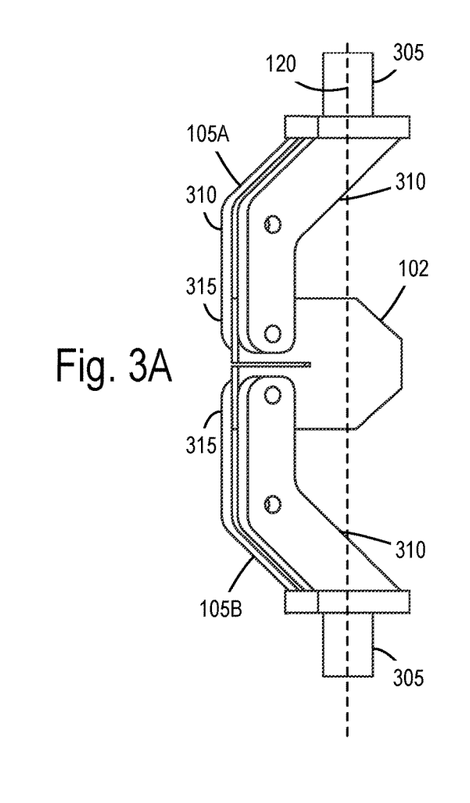
FIG. 3A illustrates tension arms of a tension load fixture holding a first specimen, in accordance with example embodiments.
Figure 3B:
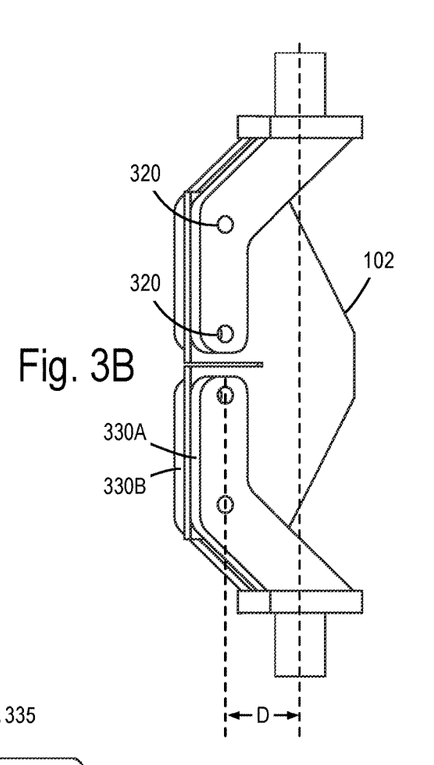
FIG. 3B illustrates tension arms of a tension load fixture holding a larger specimen, in accordance with example embodiments.
Figure 3C:
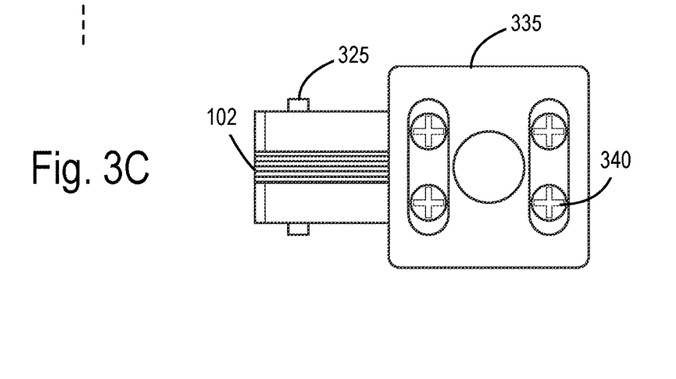
FIG. 3C illustrates a top view of a tension arm, in accordance with example embodiments.

FIGS. 3A and 3B illustrate an example of tension arms (105A, 105B) of the tension load fixture 100 holding a first specimen 102 and a second specimen 102 that is larger than the first specimen 102. FIG. 3C illustrates a top view of an example of one of the tension arms (105A, 105B).

Some examples of the tension arms (105A, 105B) comprise a first section 305 and a section 310. In some examples, the first section 305 of at least one of the tension arms (105A, 105B) is configured to be in mechanical communication with the load generator 125 of the tension load fixture 100. The load generator 125 is configured to generate tension and/or loading forces within the specimen 102. For instance, an example of the load generator 125 is configured to apply static and fatigue loading forces to the specimen 102. In this regard, some examples of the load generator 125 are configured to generate tension and/or loading forces that follow a load force profile.

In some examples, the respective first sections 305 of the tension arms (105A, 105B) are configured to be releasably coupled to the tension load fixture 100. For instance, in some examples, the respective first sections 305 of the pair of tension arms (105A, 105B) are threaded to facilitate screwing the respective first sections 305 to the tension load fixture 100.

In some examples, the respective first sections 305 of the tension arms (105A, 105B) have longitudinal axes that correspond with the central axis 120 of the tension load fixture 100. Some examples of the respective ends 315 of the second sections 310 are offset from the central axis 120 by a particular distance, D. In this regard, some examples of the second sections 310 define an elongated portion having a longitudinal axis that is parallel to the longitudinal axis of the first section 305, and that is offset from the longitudinal axis of the first section 305 by the particular distance, D.

Some examples of the respective second sections 310 are configured to be releasably coupled to the opposite end regions of the specimen 102. In this regard, some examples of the second sections 310 define a plurality of openings 320 along respective lengths. For example, the openings 320 are defined along the elongated portion described above. In some examples, at least one opening 320 of each of the respective second sections 310 is configured to align with a corresponding opening 225 of an end region of the specimen 102. The opening 320 in the second section 310 and the opening 225 in the specimen 102 are configured to receive a pin 325 that facilitates releasably coupling the respective second sections 310 to the opposite end regions of the specimen 102. In some examples, the spacing between adjacent openings 320 on the second sections 310 of the tension arms (105A, 105B) is configured to facilitate releasably coupling specimens 102 of varied sizes between the second sections 310.

In some examples, the respective second sections 310 of the respective tension arms (105A, 105B) comprise a pair of plates (330A, 330B). Some examples of the plates (330A, 330B) are configured to abut opposite surfaces of the specimen 102. In this regard, in some examples, the distance between the plates (330A, 330B) substantially equals the thickness of the specimen 102.

In some examples, the plates (330A, 330B) are adjustably coupled to respective first sections 305 of the tension arms (105A, 105B) to facilitate adjusting the distance between the plates (330A, 330B) to accommodate specimens 102 of different thicknesses. For instance, some examples of the first section 305 comprise an end member 335 to which the plates (330A, 330B) are adjustably coupled. Some examples of the end member 335 comprise one or more grooves through which fasteners 340 for securing the plates (330A, 330B) to the end member 335 pass. The fasteners 340 can be positioned anywhere within the groove to facilitate adjusting the distance between the plates (330A, 330B).

Figure 4:
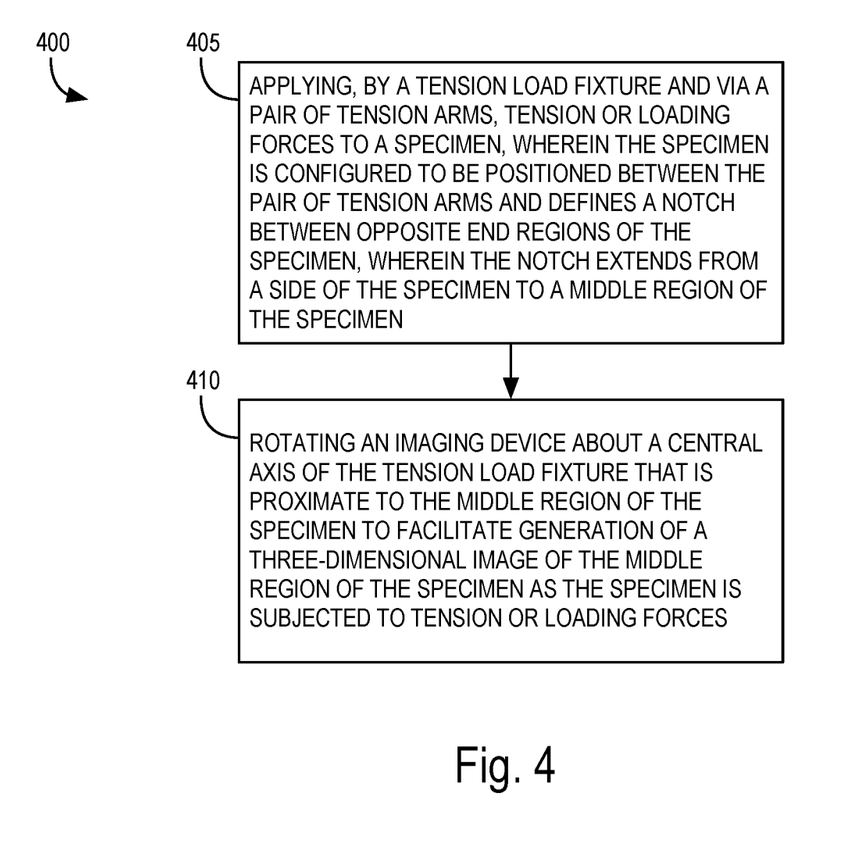
FIG. 4 illustrates operations performed by one or more devices described herein, in accordance with example embodiments.

FIG. 4 illustrates an example of operations 400 performed by some examples of the devices described herein. The operations at block 405 involve applying, by a tension load fixture and via a pair of tension arms (105A, 105B), tension or loading forces to a specimen 102. The specimen 102 is configured to be positioned between the pair of tension arms (105A, 105B) and defines a notch 220 between opposite end regions of the specimen. The notch 220 extends from a side of the specimen 102 to a middle region of the specimen 102.

The operations at block 410 involve rotating an imaging device 115 about a central axis 120 of the tension load fixture 100 that is proximate to the middle region of the specimen 102 to facilitate the generation of a three-dimensional image of the middle region of the specimen 102 as the specimen 102 is subjected to tension or loading forces.

In some examples, the operations that involve applying tension or loading forces to the specimen 102 involve applying tension or loading forces to the specimen 102 by a pair of tension arms that each comprise a first section 305 and a second section 310. Longitudinal axes of respective first sections 305 correspond with the central axis 120, and respective second sections 310 are configured to be releasably coupled to the opposite end regions of the specimen 102.

In some examples, the operations that involve applying tension or loading forces to the specimen 102 by a pair of tension arms (105A, 105B) that each comprise a first section 305 and a second section 310 involve applying tension or loading forces to the specimen 102 via respective ends 315 of the second section 310. The respective ends 315 are offset from the central axis 120 by a particular distance.

In some examples, the operations that involve applying tension or loading forces to the specimen 102 by a pair of tension arms (105A, 105B) that each comprise a first section 305 and a second section 310 involve applying tension or loading forces to the specimen via respective second sections 310 that define a plurality of openings 320 along respective lengths of the respective second sections 310. At least one opening 320 of each of the respective second sections 310 is configured to align with a corresponding opening 225 of an end region of the specimen 102 and is configured to receive a pin 325 that facilitates releasably coupling the respective second sections 310 to the opposite end regions of the specimen 102. The spacing between adjacent openings of the plurality of openings 320 is configured to facilitate releasably coupling specimens 102 of different sizes between the respective second sections 310.

In some examples, the operations that involve applying tension or loading forces to the specimen 102 by a pair of tension arms (105A, 105B) that each comprise a first section 305 and a second section 310 involve applying tension or loading forces to the specimen via respective second sections 310 that comprise a pair of plates configured to abut opposite surfaces of the specimen 102. The distance between the pair of plates (330A, 330B) substantially equals a thickness of the specimen 102.

In some examples, the operations that involve applying tension or loading forces to the specimen 102 via the respective second sections 310 that comprise a pair of plates (330A, 330B) involve applying tension or loading forces to the specimen 102 via respective second sections that comprise a pair of plates (330A, 330B) that are adjustably coupled to respective first sections 305 of the respective tension arms (105A, 105B) to facilitate adjusting the distance between the pair of plates (330A, 330B) to accommodate specimens 102 having different thicknesses.

In some examples, the operations that involve applying tension or loading forces to the specimen 102 by a pair of tension arms (105A, 105B) that each comprise a first section 305 involve applying tension or loading forces to the specimen via respective first sections 305 that are configured to be in mechanical communication with a load generator 125. The load generator 125 is configured to generate tension or loading forces within the specimen 102.

In some examples, the operations that involve applying tension or loading forces via a load generator 125 involve applying tension or loading forces to the specimen 102 via a load generator 125 that is configured to generate a cyclical amount of tension or loading forces in within the specimen 102.

In some examples, the operations that involve applying tension or loading forces to the specimen 102 by a pair of tension arms (105A, 105B) that each comprise a first section 305 involve applying tension or loading forces to the specimen via respective first sections 305 that are configured to be releasably coupled to the tension load fixture 100.

Some examples of the operations involve compiling, by a controller 150, information received from the imaging device 115 into a 3D image of the middle region of the specimen 102.

Some examples of the operations involve identifying and/or determining, by the controller 150 and based on the information communicated from the imaging device 115, characteristics of one or more cracks that develop in the specimen 102 during application of the tension and/or loading forces.

Some examples of the operations involve determining, by the controller 150, the dimensions of cracks (e.g., length, height, position, etc.) that develop within the specimen 102 during the application of the tension and/or loading forces.

Some examples of the operations involve determining, by the controller 150, the layer of the specimen 102 in which the crack occurs (e.g., matrix phases 5, reinforcement layer 2, etc.).

Some examples of the operations involve outputting, by the controller 150, data that relates the characteristics of one or more cracks that form in the specimen 102 with the amount of tension and/or loading forces applied to the specimen 102 during any particular interval.

Figure 5:
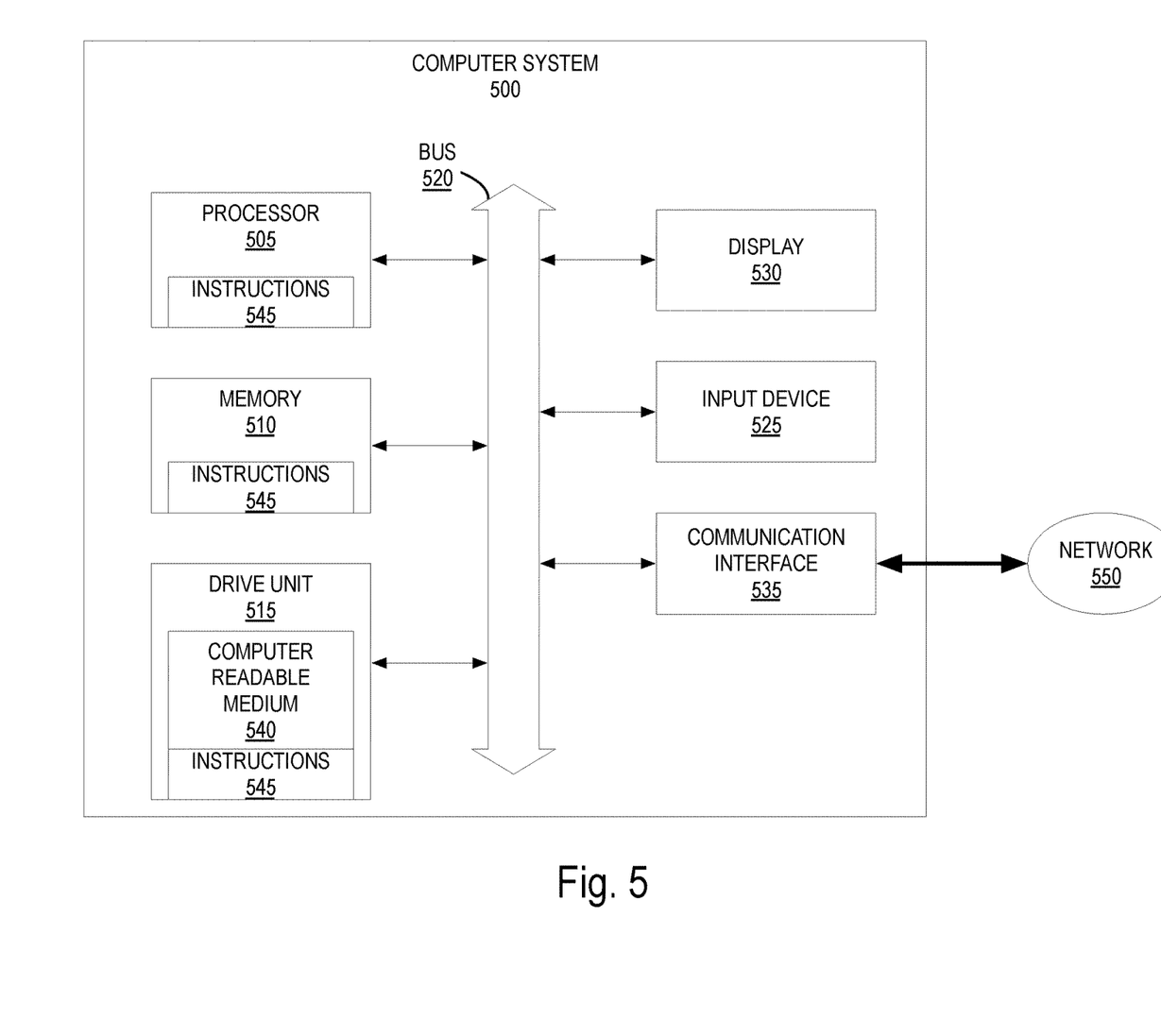
FIG. 5 illustrates a computer system, in accordance with example embodiments.

FIG. 5 illustrates an example of a computer system 500 that can form part of or implement any of the systems and/or devices described above. Some examples of the computer system 500 include a set of instructions 545 that the processor 505 can execute to cause the computer system 500 to perform any of the operations described above. Some examples of the computer system 500 operate as a stand-alone device or can be connected, e.g., using a network, to other computer systems or peripheral devices.

In a networked example, some examples of the computer system 500 operate in the capacity of a server or as a client computer in a server-client network environment, or as a peer computer system in a peer-to-peer (or distributed) environment. Some examples of the computer system 500 are implemented as or incorporated into various devices, such as a personal computer or a mobile device, capable of executing instructions 545 (sequential or otherwise), causing a device to perform one or more actions. Further, some examples of the systems described include a collection of subsystems that individually or jointly execute a set, or multiple sets, of instructions to perform one or more computer operations.

Some examples of the computer system 500 include one or more memory devices 510 communicatively coupled to a bus 520 for communicating information. In addition, in some examples, code operable to cause the computer system to perform operations described above is stored in the memory 510. Some examples of the memory 510 are random-access memory, read-only memory, programmable memory, hard disk drive, or any other type of memory or storage device.

Some examples of the computer system 500 include a display 530, such as a liquid crystal display (LCD), organic light-emitting diode (OLED) display, or any other display suitable for conveying information. Some examples of the display 530 act as an interface for the user to see processing results produced by processor 505.

Additionally, some examples of the computer system 500 include an input device 525, such as a keyboard or mouse or touchscreen, configured to allow a user to interact with components of system 500.

Some examples of the computer system 500 include a drive unit 515 (e.g., flash storage). Some examples of the drive unit 515 include a computer-readable medium 540 in which the instructions 545 can be stored. Some examples of the instructions 545 reside completely, or at least partially, within the memory 510 and/or within the processor 505 during execution by the computer system 500. Some examples of the memory 510 and the processor 505 include computer-readable media, as discussed above.

Some examples of the computer system 500 include a communication interface 535 to support communications via a network 550. Some examples of the network 550 include wired networks, wireless networks, or combinations thereof. Some examples of the communication interface 535 facilitate communications via any number of wireless broadband communication standards, such as the Institute of Electrical and Electronics Engineering (IEEE) standards 802.11, 802.12, 802.16 (WiMAX), 802.20, cellular telephone standards, or other communication standards.

Accordingly, some examples of the methods and systems described herein are realized in hardware, software, or a combination of hardware and software. Some examples of the methods and systems are realized in a centralized fashion in at least one computer system or in a distributed fashion where different elements are spread across interconnected computer systems. Any kind of computer system or other apparatus adapted for carrying out the methods described herein can be employed.

Some examples of the methods and systems described herein are embedded in a computer program product, which includes all the features that facilitate the implementation of the operations described herein and which, when loaded in a computer system, cause the computer system to perform these operations. A computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While the systems and methods of operation have been described with reference to certain examples, it will be understood by those skilled in the art that various changes can be made, and equivalents can be substituted without departing from the scope of the claims. Therefore, it is intended that the present methods and systems are not limited to the particular examples disclosed but that the disclosed methods and systems include all embodiments falling within the scope of the appended claims.

The invention claimed is:

1. A tension load fixture for applying tension or loading forces to a specimen, the tension load fixture comprising:
   a pair of tension arms configured to releasably couple to opposite end regions of a specimen and to apply tension or loading forces to the specimen, wherein the specimen is configured to be positioned between the pair of tension arms and defines a notch between the opposite end regions of the specimen, wherein the notch extends from a side of the specimen to a middle region of the specimen;
   an imaging device configured to capture one or more images of the middle region of the specimen, and that is configured to rotate about an axis to facilitate generation of a three-dimensional image of the middle region of the specimen as the specimen is subjected to tension or loading forces; and a controller communicatively coupled to the imaging device and to a load generator, the controller configured to:
control, via the load generator, application of tension or loading forces to the specimen;
determine, based on the one or more images, dimensions of a plurality of cracks that develop beneath a surface of the specimen and determine specific layers associated with the plurality of cracks in response to the application of tension or loading forces to the specimen, wherein:
the plurality of cracks are different from the notch, and
the dimensions of a crack, of the plurality of cracks, comprise a length of the crack, a height of the crack, and a position of the crack;
track a damage mode, for each specific layer associated with the plurality of cracks, wherein, for each specific layer, the damage mode indicates a matrix crack or a fiber crack; and
output data for each specific layer associated with the plurality of cracks, wherein the data indicates the dimensions of the plurality of cracks and the corresponding damage mode.

2. The tension load fixture according to claim 1, wherein each tension arm comprises a first section and a second section, wherein longitudinal axes of respective first sections correspond with a central axis, and wherein respective second sections are configured to be releasably coupled to the opposite end regions of the specimen.

3. The tension load fixture according to claim 2, wherein respective ends of the respective second sections are offset from the central axis by a particular distance.

4. The tension load fixture according to claim 2, wherein the respective second sections define a plurality of openings along respective lengths of the respective second sections, wherein at least one opening of each of the respective second sections is configured to align with a corresponding opening of an end region of the specimen and is configured to receive a pin that facilitates releasably coupling the respective second sections to the opposite end regions of the specimen, wherein a spacing between adjacent openings of the plurality of openings is configured to facilitate releasably coupling specimens of different sizes between the respective second sections.

5. The tension load fixture according to claim 2, wherein each of the respective second sections comprise a pair of plates configured to abut opposite surfaces of the specimen, wherein a distance between the pair of plates substantially equals a thickness of the specimen.

6. The tension load fixture according to claim 5, wherein the pair of plates are adjustably coupled to respective first sections of the respective tension arms to facilitate adjusting the distance between the pair of plates to accommodate specimens having different thicknesses.

7. The tension load fixture according to claim 2, wherein the first section of at least one of the pair of tension arms is configured to be in mechanical communication with the load generator that is configured to generate tension or loading forces within the specimen.

8. The tension load fixture according to claim 7, wherein the load generator is configured to generate a cyclical amount of tension or loading forces within the specimen.

9. The tension load fixture according to claim 2, wherein the respective first sections of the pair of tension arms are configured to be releasably coupled to the tension load fixture.

10. The tension load fixture according to claim 2, wherein the respective first sections of the pair of tension arms are threaded to facilitate screwing the respective first sections to the tension load fixture.

11. A method for evaluating a specimen as the specimen undergoes tension or loading forces, the method comprising:
applying, by a tension load fixture and via a pair of tension arms, tension or loading forces to a specimen, wherein the specimen is configured to be positioned between the pair of tension arms and defines a notch between opposite end regions of the specimen, wherein the notch extends from a side of the specimen to a middle region of the specimen;
rotating an imaging device about an axis to facilitate generation of a three-dimensional image of the middle region of the specimen as the specimen is subjected to tension or loading forces;
controlling, by a controller communicatively coupled to the imaging device and to a load generator, application of tension or loading forces to the specimen;
determining, by the controller and based on the three-dimensional image, dimensions of a plurality of cracks that develop beneath a surface of the specimen and determining specific layers associated with the plurality of cracks in response to the application of tension or loading forces to the specimen, wherein:
the plurality of cracks are different from the notch, and
the dimensions of a crack, of the plurality of cracks, comprise a length of the crack, a height of the crack, and a position of the crack;
tracking a damage mode, for each specific layer associated with the plurality of cracks, wherein, for each specific layer, the damage mode indicates a matrix crack or a fiber crack; and
outputting data for each specific layer associated with the plurality of cracks, wherein the data indicates the dimensions of the plurality of cracks and the corresponding damage mode.

12. The method according to claim 11, wherein applying tension or loading forces to the specimen comprises:
applying tension or loading forces to the specimen by a pair of tension arms that each comprise a first section and a second section, wherein longitudinal axes of respective first sections correspond with a central axis, and wherein respective second sections are configured to be releasably coupled to the opposite end regions of the specimen.

13. The method according to claim 12, wherein applying tension or loading forces to the specimen by a pair of tension arms that each comprise a first section and a second section comprises:
applying tension or loading forces to the specimen via respective ends of the second section, wherein the respective ends are offset from the central axis by a particular distance.

14. The method according to claim 12, wherein applying tension or loading forces to the specimen by a pair of tension arms that each comprise a first section and a second section comprises:
applying tension or loading forces to the specimen via respective second sections that define a plurality of openings along respective lengths of the respective second sections, wherein at least one opening of each of the respective second sections is configured to align with a corresponding opening of an end region of the specimen and is configured to receive a pin that facilitates releasably coupling the respective second sections to the opposite end regions of the specimen, wherein a spacing between adjacent openings of the plurality of openings is configured to facilitate releasably coupling specimens of different sizes between the respective second sections.

15. The method according to claim 12, wherein applying tension or loading forces to the specimen by a pair of tension arms that each comprise a first section and a second section comprises:
applying tension or loading forces to the specimen via respective second sections that comprise a pair of plates configured to abut opposite surfaces of the specimen, wherein a distance between the pair of plates substantially equals a thickness of the specimen.

16. The method according to claim 15, wherein applying tension or loading forces to the specimen via the respective second sections that comprise a pair of plates comprises:
applying tension or loading forces to the specimen via respective second sections that comprise a pair of plates that are adjustably coupled to respective first sections of the respective tension arms to facilitate adjusting the distance between the pair of plates to accommodate specimens having different thicknesses.

17. The method according to claim 11, wherein applying tension or loading forces to the specimen by a pair of tension arms that each comprise a first section comprises:
applying tension or loading forces to the specimen via respective first sections that are configured to be in mechanical communication with a load generator, wherein the load generator is configured to generate tension or loading forces within the specimen.

18. The method according to claim 12, wherein applying tension or loading forces via a load generator comprises:
applying tension or loading forces to the specimen via a load generator that is configured to generate a cyclical amount of tension or loading forces in within the specimen.

19. The method according to claim 11, wherein applying tension or loading forces to the specimen by a pair of tension arms that each comprise a first section comprises:
applying tension or loading forces to the specimen via respective first sections that are configured to be releasably coupled to the tension load fixture.

20. A non-transitory computer-readable medium that stores instruction code for evaluating a specimen as it undergoes tension or loading forces, wherein the instruction code is executable by a controller communicatively coupled to an imaging device and to a load generator to perform operations comprising:
applying, by a tension load fixture and via a pair of tension arms, tension or loading forces to a specimen, wherein the specimen is configured to be positioned between the pair of tension arms and defines a notch between opposite end regions of the specimen, wherein the notch extends from a side of the specimen to a middle region of the specimen;
rotating the imaging device about an axis to facilitate generation of a three-dimensional image of the middle region of the specimen as the specimen is subjected to tension or loading forces;
controlling, via the load generator, application of tension or loading forces to the specimen;
determining, based on the three-dimensional image, dimensions of a plurality of cracks that develop beneath a surface of the specimen and determining specific layers associated with the plurality of cracks in response to the application of tension or loading forces to the specimen, wherein:
the plurality of cracks are different from the notch, and
the dimensions of a crack, of the plurality of cracks, comprise a length of the crack, a height of the crack, and a position of the crack;
tracking a damage mode, for each specific layer associated with the plurality of cracks, wherein, for each specific layer, the damage mode indicates a matrix crack or a fiber crack; and
outputting data for each specific layer associated with the plurality of cracks, wherein the data indicates the dimensions of the plurality of cracks and the corresponding damage mode.

* * * * *